(No Model.)
J. DEITRICK.
THILL COUPLING.
No. 459,074.
Patented Sept. 8, 1891.
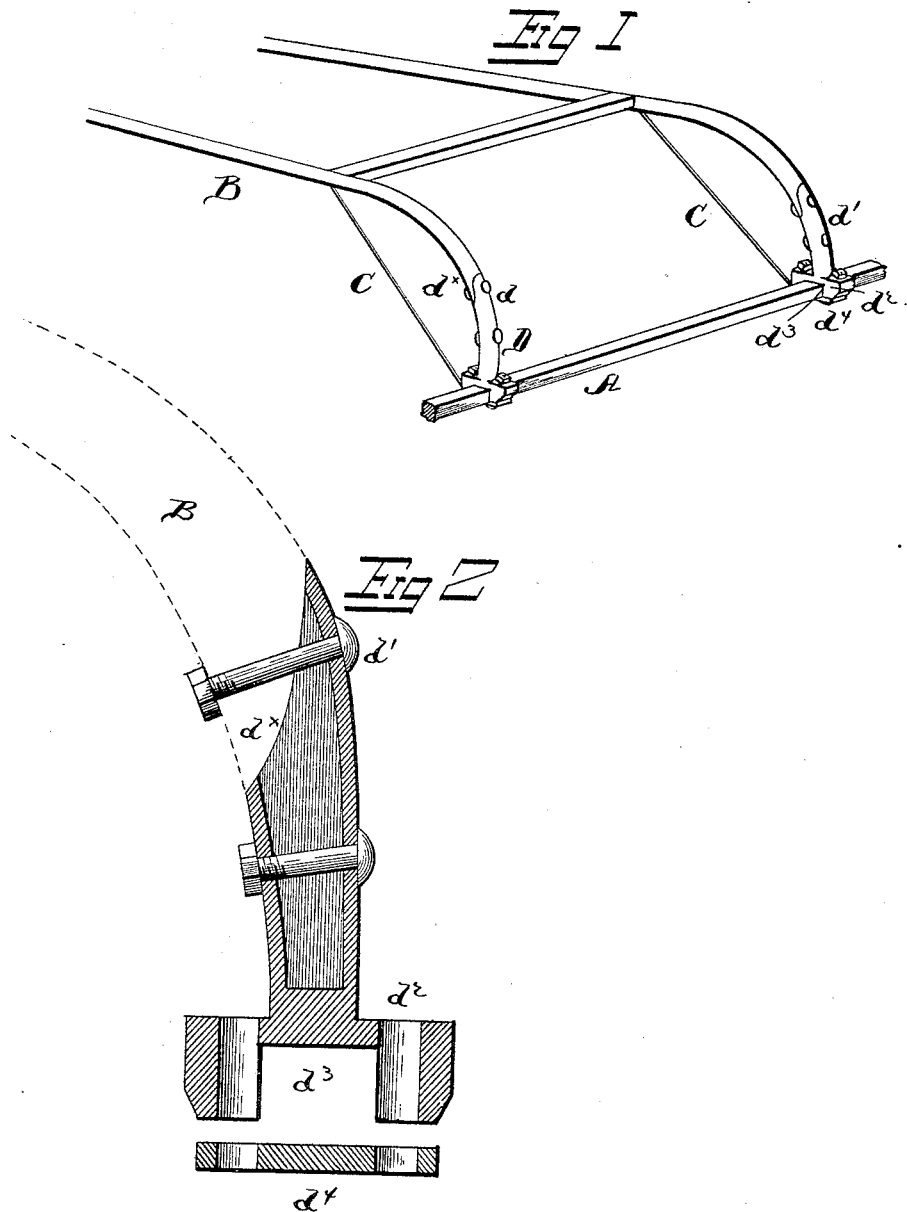

UNITED STATES PATENT OFFICE.

JOHN DEITRICK, OF ACASTO, MISSOURI.

THILL-COUPLING.

SPECIFICATION forming part of Letters Patent No. 459,074, dated September 8, 1891.

Application filed February 24, 1891. Serial No. 382,556. (No model.)

*To all whom it may concern:*

Be it known that I, JOHN DEITRICK, a citizen of the United States, residing at Acasto, in the county of Clark and State of Missouri, have invented certain new and useful Improvements in Shaft-Couplers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in shaft couplings or connections, and has especial reference to a casting in the form of a socket adapted for use in coupling the shafts of a road-cart or two-wheeled vehicle to the axle. The invention, while specially designed for this purpose, may be used as a coupling for the shafts of any character of vehicle.

The object of my invention is the provision of a simple, strong, and cheap coupling adapted to take the place of the straps now used upon two-wheeled vehicles for connecting the shaft with the axle, which will not break as the straps do in consequence of the strain brought to bear thereon, and which will perform the desired function in a thorough and efficient manner.

To attain the desired objects the invention consists of a metal socket adapted to receive the inner ends of the shaft, and which socket is provided with means for connecting it to the axle.

The invention also consists in certain details of construction, substantially as herein illustrated, described, and specifically defined by the claim.

Figure 1 represents a perspective view of my coupling-socket applied in position. Fig. 2 represents a sectional view of the socket.

Referring by letter to the drawings, A designates the axle of the vehicle, B designates the shafts, and C designates the brace-rods thereof, all of the construction used on two-wheeled vehicles or road-carts commonly used.

D designates my socket-coupling, which consists of a casting having the arm $d$ formed with a socket $d^\times$ to receive the ends of the shafts, which are retained in the socket by means of fastenings or bolts $d'$, and the casting is formed with the bifurcated cross-piece $d^2$, which fits on the upper face of the axle, and said cross-piece is formed with openings $d^3$ to receive the fastenings or clip $d^4$ for securing the socket to the axle, as is evident.

From the foregoing description and drawings the manner of applying and the purposes of my invention will be readily understood, and it will be seen that I provide a device which is simple, durable, and cheap and will not break, as do the straps in general use.

I claim as my invention—

In a shaft-coupler, the combination of the axle, the socketed arm having the upper end cut away and at the lower end formed with the bifurcated cross-pieces fitting the axle, the shafts having their reduced inner ends fitting in said sockets, the plates fitting against the under side of the axle and resting against the lugs of the bifurcated cross-pieces, bolts passing through the lugs and plates, and braces extending from the plates to the shafts, substantially as shown.

In testimony whereof I affix my signature in presence of two witnesses.

JOHN DEITRICK.

Witnesses:
  L. KING,
  L. S. MEEKS.